(12) United States Patent
Yamagishi et al.

(10) Patent No.: US 8,414,132 B2
(45) Date of Patent: Apr. 9, 2013

(54) MULTIPLE-LIGHTS-COMBINING ILLUMINATION DEVICE AND PROJECTION-TYPE DISPLAY APPARATUS USING THE SAME

(75) Inventors: Shigekazu Yamagishi, Osaka (JP); Hiroki Sugiyama, Osaka (JP); Hiroshi Kitano, Hyogo (JP)

(73) Assignee: Panasonic Corporation, Osaka (JP)

( * ) Notice: Subject to any disclaimer, the term of this patent is extended or adjusted under 35 U.S.C. 154(b) by 342 days.

(21) Appl. No.: 12/795,277

(22) Filed: Jun. 7, 2010

(65) Prior Publication Data
US 2010/0309440 A1   Dec. 9, 2010

(30) Foreign Application Priority Data
Jun. 8, 2009  (JP) .................................. 2009-136971

(51) Int. Cl.
G03B 21/26   (2006.01)
(52) U.S. Cl. .......................................... 353/94; 385/89
(58) Field of Classification Search .................... 353/94; 385/89, 36; 359/636
See application file for complete search history.

(56) References Cited

U.S. PATENT DOCUMENTS

| | | | |
|---|---|---|---|
| 6,341,876 B1 * | 1/2002 | Moss et al. ..................... | 362/268 |
| 6,765,727 B1 * | 7/2004 | Chang ............................ | 359/630 |
| 7,033,056 B2 | 4/2006 | Andersen et al. | |
| 7,182,468 B1 * | 2/2007 | Haven ............................. | 353/94 |
| 7,437,034 B2 * | 10/2008 | Gerets et al. .................... | 385/36 |
| 2009/0066920 A1 * | 3/2009 | Yamagishi et al. ............. | 353/99 |

FOREIGN PATENT DOCUMENTS
JP   2006-308778   11/2006

* cited by examiner

Primary Examiner — Francis M Legasse, Jr.
Assistant Examiner — Jerry Brooks
(74) Attorney, Agent, or Firm — Hamre, Schumann, Mueller & Larson, P.C.

(57) ABSTRACT

A multiple-lights-combining illumination device includes multiple light sources, multiple sub-rod integrators that respectively guide light from the multiple light sources, and a main rod integrator that guides light from the multiple sub-rod integrators. Each of the sub-rod integrators has reflection surfaces that are parallel to each other in a longitudinal direction, and has an entrance surface and an exit surface that are parallel or perpendicular to each other at ends thereof, the main rod integrator has reflection surfaces that are parallel to each other in a longitudinal direction, and has an entrance surface and an exit surface that are perpendicular to the reflection surfaces at ends thereof, and each reference optical axis that passes through an optical centroid portion of a light-emitting part of the light sources along a light emission direction is arranged so as to pass through substantially a center of the entrance surface of the respective sub-rod integrator. It is possible to use efficiently light while obtaining high intensity by combining light from multiple light sources, and furthermore possible to obtain a small and inexpensive device.

12 Claims, 6 Drawing Sheets

MULTIPLE-LIGHTS-COMBINING ILLUMINATION DEVICE AND PROJECTION-TYPE DISPLAY APPARATUS USING THE SAME

BACKGROUND OF THE INVENTION

1. Field of the Invention

The present invention relates to an illumination device configured to combine lights from multiple light sources using rod integrators, and in particular to an illumination device preferably used in a high-intensity projection-type display apparatus.

2. Description of Related Art

Projection-type display apparatuses can be sorted roughly into portable-type small-sized devices, medium-sized devices for small and medium-sized conference rooms, and high-intensity large-sized devices for use in large conference rooms, movie theaters, and the like. Among these, in particular, the large-sized devices cannot be replaced with flat displays.

In the configuration of such large-sized devices, a high pressure mercury lamp is used as a light source with large output and a small light-emitting unit. A xenon light source is used in a large-sized device whose intensity is particularly high. However, the latter light source has a large bulb, while the light-emitting part is small, and the luminous efficiency is low, so that a large power source is necessary. Accordingly, the entire device is very large, and thus its usage is limited. For such a reason, commercial high-intensity apparatuses achieve high intensity by using a plurality of high pressure mercury lamps that can be comparatively smaller in size.

For the high-intensity devices thus provided with a plurality of light sources, one of the measures to achieve still higher intensity is to increase the power of the light sources. However, adopting of such a measure is not easy since light source development, cooling means development, and the like are necessary. Another measure to achieve high intensity is to improve combining efficiency when combining lights from multiple light sources. This measure is important as a measure to be selected since high intensity can be achieved with the same power by effectively using light that is wasted due to conversion into heat.

Various inventions for improving the combining efficiency of combining lights from multiple light sources have been made. The following are main examples of improvements.

JP 2006-308778A discloses a configuration in which a deflecting member is provided on the entrance side of a rod integrator that combines light from a plurality of light sources, and makes the illumination distribution uniform. The deflecting member transmits and deflects light in such a manner that system optical axes from the light sources just before entering the rod integrator are perpendicular to the entrance surface. A refractive-type prism is used as the deflecting member.

Further, U.S. Pat. No. 7,033,056 discloses a configuration in which a combination of a sub-rod integrator and a rectangular prism is provided on the entrance side of a main rod integrator that combines light from a plurality of light sources, and makes the illumination distribution uniform. This rectangular prism reflects light in such a manner that system optical axes from the light sources just before entering the rod integrator are perpendicular to the entrance surface.

However, these conventional examples have problems such as the following from the viewpoint of practical use.

In the case of the example disclosed in JP 2006-308778A, the refraction prism exit faces are disposed in an inclined manner relative to the entrance surface of the rod integrator. Accordingly, some of the light that is condensed in the vicinity of the center of the entrance surface of the rod integrator, with which a wide gap is formed, will enter through a refraction surface for the light from a different light source. As a result, such light does not effectively reach an illumination region, and becomes loss light.

Further, although the rectangular prism in the example disclosed in the U.S. Pat. No. 7,033,056 has a size of several millimeters in fact, the entrance and exit surfaces thereof need reflection prevention multi-coating, and the reflection surface thereof needs heat-resistant multilayer film mirror coating. With this size, generally a process is performed in a manner that a prism is created in a large size, and grinding is performed after coating, because if coating is performed after grinding, a shadow of the coating jig remains. That is, when coating is performed as the latter step, there is no waste portion after coating, and thus grinding cannot be performed. Accordingly, a shadow of the coating jig will remain somewhere. Also, there is a problem that the produced prisms are expensive.

SUMMARY OF THE INVENTION

Therefore, it is an object of the present invention to provide a multiple-lights-combining illumination device that can use efficiently light while having a configuration for obtaining high intensity by combining light from multiple light sources, and that furthermore is small and inexpensive.

A multiple-lights-combining illumination device of the present invention includes: multiple light sources; multiple sub-rod integrators that respectively guide light from the multiple light sources; and a main rod integrator that guides light from the multiple sub-rod integrators.

Each of the sub-rod integrators has reflection surfaces that are parallel to each other in a longitudinal direction, and has an entrance surface and an exit surface that are parallel or perpendicular to each other at ends thereof. The main rod integrator has reflection surfaces that are parallel to each other in a longitudinal direction, and has an entrance surface and an exit surface that are perpendicular to the reflection surfaces at ends thereof. Each reference optical axis that passes through an optical centroid portion of a light-emitting part of the light sources along a light emission direction is arranged so as to pass through substantially a center of the entrance surface of the respective sub-rod integrator.

According to this configuration, a high-intensity device can use efficiently light while using multiple light sources. In addition, the device is small, and thus it is possible to minimize the cost for realizing such a device.

DETAILED DESCRIPTION OF THE INVENTION

Figure 1:
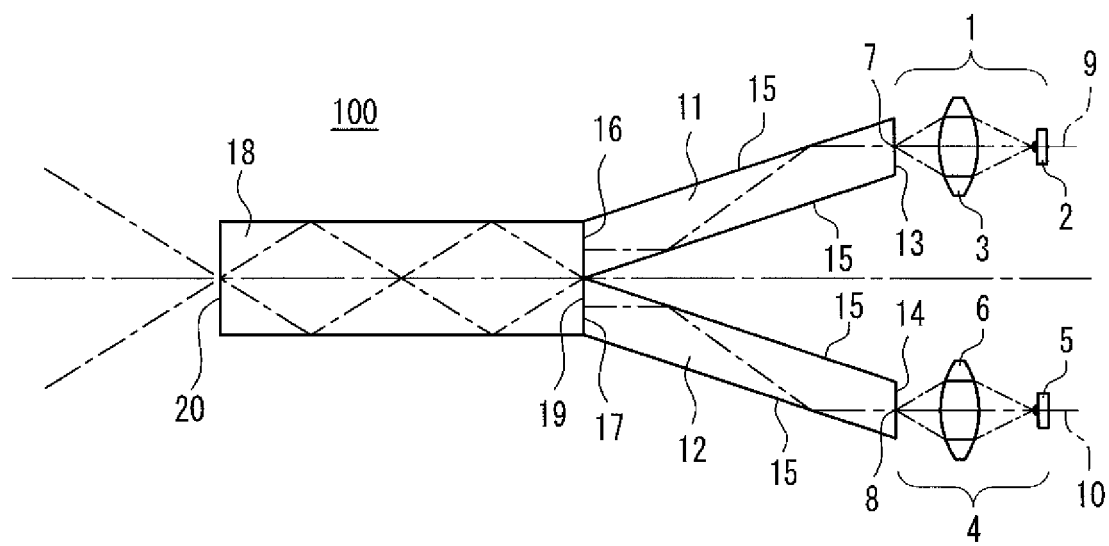
FIG. 1 is a plan view showing the configuration of a multiple-lights-combining illumination device according to Embodiment 1.

Based on the above-described configuration, modifications of a multiple-lights-combining illumination device of the present invention can be as follows.

Specifically, it is preferable to adopt a configuration in which the following relationship is satisfied:

$$n1 \cdot \sin(\theta i - \sin^{-1}(\sin(\theta c)/n1)) > 1$$

where $\theta i$ represents an incident angle of each of the reference optical axes with respect to the reflection surface of the respective sub-rod integrator, $\theta c$ represents an angle formed in air at the entrance surface of the respective sub-rod integrator by each of the reference optical axes and light at an outermost angle of effective incident light from the respective light source that is finally allowed to exit from the main rod integrator, and n1 represents a refractive index of each of the sub-rod integrators.

It is noted that the "effective incident light" is defined as a light that is finally allowed to exit from the main rod integrator as mentioned above, and corresponds to a light in an area that is totally reflected according to the refractive index of the rod integrators without extending out of the entrance of the sub-rod integrators functioning as an aperture. Accordingly, the optical axis that passes perpendicularly through the entrance surface of the sub-rod integrator is incident on the reflection surface at an angle, and the angle can be set such that all the necessary incident light is totally reflected.

It is preferable to adopt a configuration in which the following relationship is satisfied:

$$|n1 \cdot \sin(\pi/2 - 2\theta i + \sin^{-1}((\sin(\theta c))/n1)| < 1$$

where $\theta i$ represents an incident angle of each of the reference optical axes with respect to the reflection surface of the respective sub-rod integrator, $\theta c$ represents an angle formed by each of the reference optical axes and light at an outermost angle of effective incident light from the respective light source in air, and n1 represents a refractive index of a material of each of the sub-rod integrators, and when – (minus) angle is set to a direction in which an angle formed by incident light from the respective light source with respect to a line perpendicular to the reflection surface decreases, and + (plus) angle is set to a direction in which the angle increases, $\theta c$ is given a range between $-\theta c$ and $+\theta c$.

It is possible to adopt a configuration wherein when the reference optical axis passes perpendicularly through the entrance surface of the respective sub-rod integrator, an angle formed by the entrance surface and the reflection surface is 45 degrees. This enables a configuration that easily can have a design margin.

It is possible to adopt a configuration further including a reflection mirror arranged in a vicinity of the entrance surface of each of the sub-rod integrators, wherein light from the light source is bent by the reflection mirrors, so that the reference optical axis passes perpendicularly through the entrance surface of the respective sub-rod integrator.

It is possible to adopt a configuration in which two sets of the light source and the sub-rod integrator are provided, and the two light sources are arranged at opposing positions.

It is possible to adopt a configuration in which four sets of the light source and the sub-rod integrator are provided, and two pairs of two sets of the light sources are arranged at opposing positions.

It is possible to adopt a configuration in which the sub rod integrators and the main rod integrator are glass rod integrators.

It is possible to adopt a configuration in which each of the light sources includes a discharge lamp and a reflector provided with an elliptical reflection surface, and each of the reflectors has one focal point on a light-emitting part of the respective discharge lamp, and another focal point on the entrance surface of the respective sub-rod integrator.

It is possible to adopt a configuration in which each of the light sources includes a discharge lamp, a reflector provided with a reflection surface that reflects light from the discharge lamp in an opening direction, and a condensing lens, and a position where the light from each of the discharge lamps is condensed by the respective condensing lens is located on the entrance surface of the respective sub-rod integrator.

It is possible to adopt a configuration in which each of the light sources includes an LED and a condensing lens that condenses light from the LED, and a position where the light from the LED is condensed by the respective condensing lens is located on the entrance surface of the respective sub-rod integrator.

It is possible to adopt a configuration in which the exit surface of each of the sub-rod integrators and the entrance surface of the main rod integrator are arranged so as to be parallel and adjacent to each other.

A projection-type display apparatus of the present invention can be configured to include the multiple-lights-combining illumination device having any of the above configurations, a relay optical system that guides light from the main rod integrator, an image display element that is arranged at an illumination position of the light guided by the relay optical system, and a projection lens with which an image on the image display element can be magnified and projected.

Hereinafter, a multiple-lights-combining illumination device of the present invention, and a projection-type display apparatus using the same will be described more specifically by way of illustrative embodiments with reference to the drawings.

Embodiment 1

FIG. 1 shows a configuration of a multiple-lights-combining illumination device 100 according to Embodiment 1. A first LED light source unit 1 is constituted by an LED light source 2 mounted on a board (not shown), and a condensing lens 3 that is arranged in front of the LED light source 2 and condenses emitted light. Likewise, a second LED light source unit 4 is constituted by an LED light source 5 mounted on a board, and a condensing lens 6 that is arranged in front of the LED light source 5 and condenses emitted light. A condensing position 7 of the first LED light source unit 1 and a condensing position 8 of the second LED light source unit 4 are set respectively on entrance surfaces 13 and 14 of sub-rod integrators 11 and 12. Further, a reference optical axis 9 of the first LED light source unit 1 and a reference optical axis 10 of the second LED light source unit 4 pass perpendicularly through substantially the center of these entrance surfaces 13 and 14. Here, a reference optical axis is defined as an optical axis that passes through the optical centroid portion of the light-emitting part of the light source, and that matches the light emission direction.

The sub-rod integrators 11 and 12 are hexahedrons that are provided with parallel entrance and exit surfaces, namely, the entrance surfaces 13 and 14, and exit surfaces 16 and 17. The entrance surfaces 13 and 14 and the exit surfaces 16 and 17 are formed in an inclined manner relative to two reflection surfaces 15 among the four surfaces that form the side surfaces in the longitudinal direction, as shown in FIG. 1. The inclination is set such that light that enters through the entrance surface 13 along the reference optical axis 9 is totally reflected by the reflection surfaces 15. The two reflection surfaces are parallel to each other. The same applies to the sub-rod integrator 12.

The light from the sub-rod integrators 11 and 12 further is guided by a main rod integrator 18. The main rod integrator 18 has reflection surfaces parallel to each other in the longitudinal direction, and has an entrance surface 19 and an exit surface 20 that are perpendicular to the reflection surfaces, at the ends.

Figure 2:
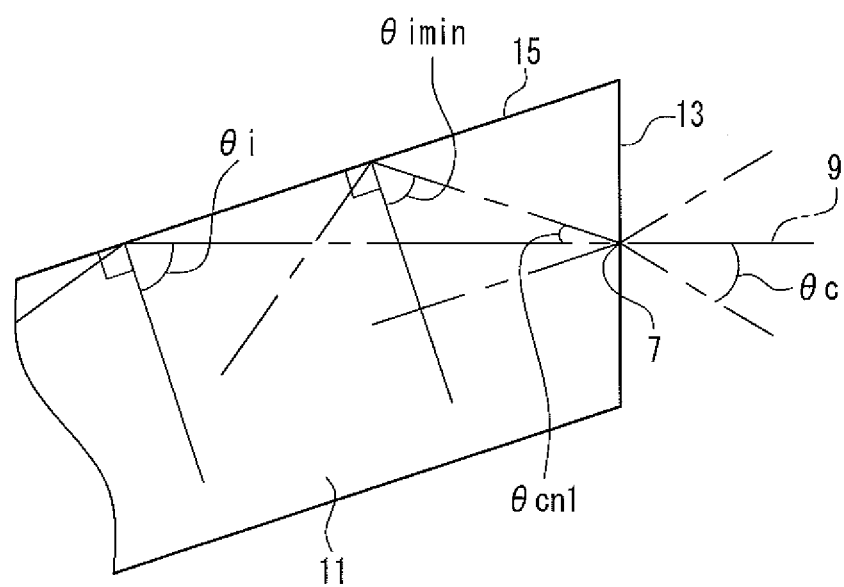
FIG. 2 is a plan view showing an enlarged view of an entrance portion of a sub-rod integrator with which the multiple-lights-combining illumination device is provided.

More specific settings are described with reference to FIG. 2 as well. Here, $\theta i$ indicates an incident angle formed when the reference optical axis 9 of the first LED light source unit 1 is incident on a reflection surface 15 that faces the entrance surface 13, among the four reflection surfaces other than the entrance surface 13 and the exit surface 16 of the sub-rod integrator 11. $\theta c$ indicates an angle formed in the air by the reference optical axis 9 and the light beam at the outermost angle among the effective light from the first LED light source unit 1. The sub-rod integrators are solid, and the refractive index of the material thereof is assumed to be n1. The light that is most unlikely to be totally reflected is light that forms the largest angle with the reference optical axis 9, and that is incident on the reflection surface 15 at the smallest angle. Specifically, this incident angle is an angle formed by the light at the outermost angle that forms the angle $\theta c$ with respect to the reference optical axis 9 that passes through the entrance surface 13.

An angle $\theta cn1$ formed by the reference optical axis 9 and the light at the outermost angle that has entered the sub-rod integrator 11 is as follows.

$$\theta cn1 = \sin^{-1}(\sin(\theta c)/n1)$$

The incident angle formed by this light with respect to the reflection surface 15 is $\theta imin$. The value of $\theta imin$ is expressed by the following equation.

$$\theta imin = \theta i - \sin^{-1}(\sin(\theta c)n1)$$

The following relationship is necessary for this light to be totally reflected.

$$n1 \cdot \sin(\theta imin) > 1$$

In other words, the following equation (1) expresses a necessary condition for total reflection.

$$n1 \cdot \sin(\theta i - \sin^{-1}(\sin(\theta c)/n1)) > 1 \quad (1)$$

Note that if $\theta c$ is 30°, and n1 is 1.5, $\theta i$ is as follows.

$$\theta i > 61.3°$$

Further, the sum of the areas of the exit surfaces 16 and 17 of the sub-rod integrators 11 and 12 is set to be equal to the area of the entrance surface 19 of the main rod integrator 18. The reference optical axis 9 of the first LED light source unit 1 and the reference optical axis 10 of the second LED light source unit 4 that have passed through the sub-rod integrators 11 and 12 pass perpendicularly through the entrance surface 19 of the main rod integrator 18.

Light that has entered the main rod integrator 18 in this way repeatedly is reflected internally, and can exit as uniform light from the exit surface 20.

Uniform illumination can be performed by thus efficiently combining light from two light sources. With this configuration, light is propagated only by total reflection, and thus it is not necessary to apply reflection mirror coating to the rod integrators. Accordingly, cost and heat generation can be suppressed.

Further, the reference optical axis 9 of the first LED light source unit 1 and the reference optical axis 10 of the second LED light source unit 4 pass perpendicularly through the entrance surfaces 13 and 14, the exit surfaces 16 and 17 of the sub-rod integrators 11 and 12 and the entrance surface 19 of the main rod integrator 18 are adjacent and parallel to each other, and the reference optical axes 9 and 10 that are reflected repeatedly in the sub-rod integrators 11 and 12 pass perpendicularly through the exit surfaces 16 and 17 and the entrance surface 19. Thereby, the total etendue of the light sources and the etendue at the exit surface 20 of the main rod integrator 18 can be made equal. It is assumed that all the light from the light sources enters through the entrance surfaces 13 and 14 of the sub-rod integrators 11 and 12 at this time.

Embodiment 2

Figure 3:
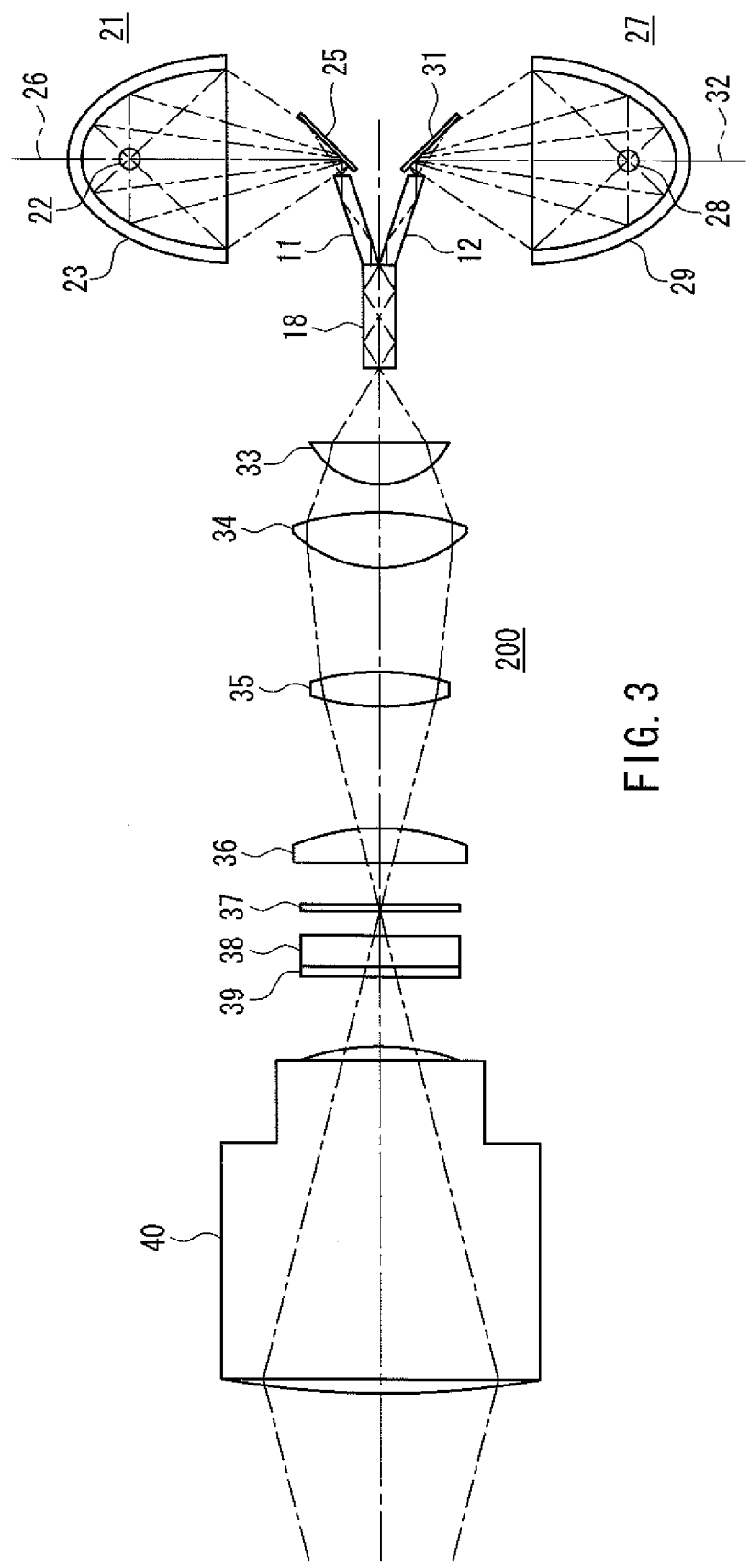
FIG. 3 is a plan view showing the configuration of a projection-type display apparatus according to Embodiment 2, a part of which being in a cross section.
Figure 4:
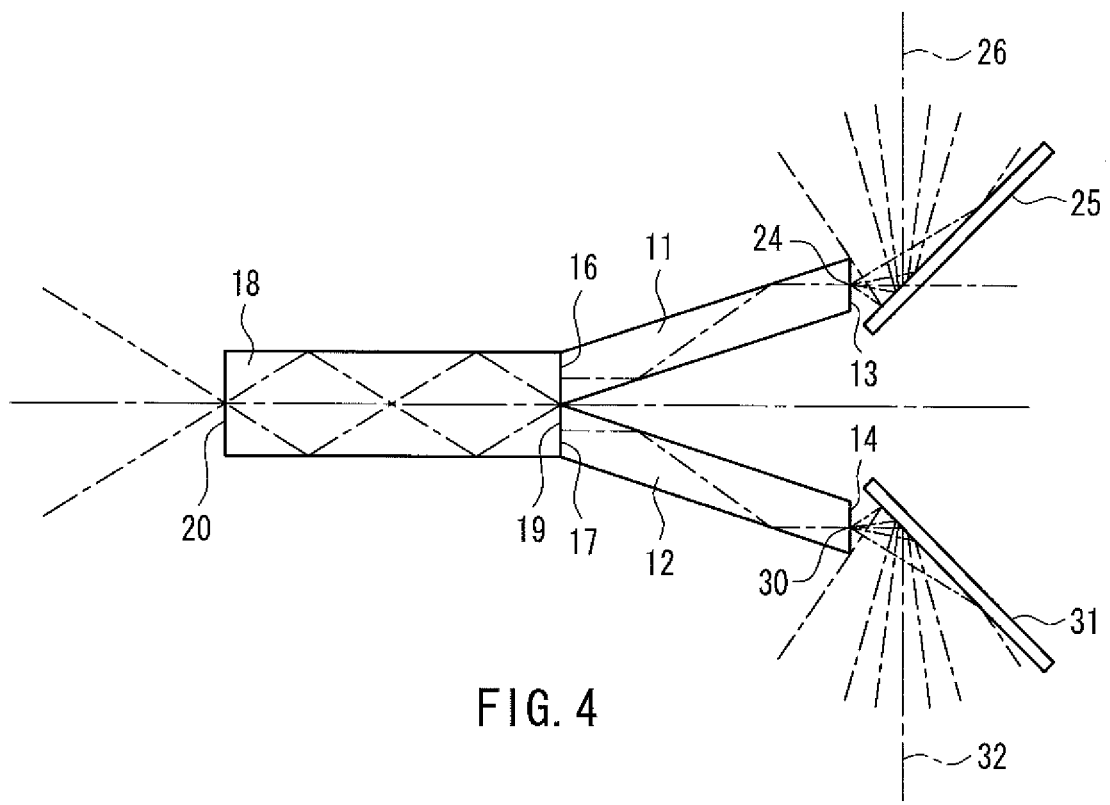
FIG. 4 is a plan view showing an enlarged view of a portion of rod integrators that is provided for a multiple-lights-combining illumination device used in the projection-type display apparatus.

FIG. 3 shows a configuration of a projection-type display apparatus 200 according to Embodiment 2. FIG. 4 shows an enlarged view of a portion of rod integrators with which a multiple-lights-combining illumination device that is used in the projection-type display apparatus 200 is provided.

A first light source unit 21 is constituted by a discharge lamp 22 that generates plasma by performing discharge between electrodes in a bulb so as to emit high-intensity light, and a reflector 23 provided with an elliptical reflection surface. The reflector 23 has one focal point on the light-emitting part of the discharge lamp 22, and another focal point 24 on the entrance surface 13 of the sub-rod integrator 11 (FIG. 4). A reflection mirror 25 is provided obliquely in the vicinity of the entrance surface 13 of the sub-rod integrator 11. Thereby, a reference optical axis 26 from the first light source unit 21 passes perpendicularly through the entrance surface 13 of the sub-rod integrator 11.

Likewise, a second light source unit 27 also is constituted by a discharge lamp 28 and a reflector 29 that have the same functionality. The reflector 29 also has a focal point 30 on the entrance surface 14 of the sub-rod integrator 12, which is the other sub-rod integrator. A reflection mirror 31 is provided obliquely in the vicinity of the entrance surface 14 of the sub-rod integrator 12. Thereby, a reference optical axis 32 from the second light source unit 27 passes perpendicularly through the entrance surface 14 of the sub-rod integrator 12.

The sub-rod integrators 11 and 12 are hexahedrons that are provided with parallel entrance and exit surfaces, namely, the entrance surfaces 13 and 14 and the exit surfaces 16 and 17, which is the same as in Embodiment 1. The entrance surfaces 13 and 14 and the exit surfaces 16 and 17 are formed in an inclined manner relative to the other four surfaces, as shown in FIG. 1. The inclination is set such that light that enters through the entrance surfaces 13 and 14 along the reference optical axes 26 and 32 is totally reflected. Details with regard to total reflection are the same as those in Embodiment 1, and thus a description thereof is not repeated.

Further, the sum of the areas of the exit surfaces 16 and 17 of the sub-rod integrators 11 and 12 is set so as to be equal to the area of the entrance surface 19 of the main rod integrator 18. The reference optical axis 26 of the first light source unit 21 and the reference optical axis 32 of the second light source unit 27 that have passed through the sub-rod integrators 11 and 12 pass perpendicularly through the entrance surface 19 of the main rod integrator 18.

Light that has entered the main rod integrator 18 in this way repeatedly is reflected internally, and can exit as uniform light from the exit surface 20.

Light that has exited from the exit surface 20 is guided by condensing lenses 33 and 34, a relay lens 35, and a field lens 36, passes through an incident polarizing plate 37, and thereafter enters a liquid crystal panel 38 serving as an image display element. Two-dimensionally arranged pixels of the liquid crystal panel 38 can be controlled independently in accordance with external signals. The light that has passed through the liquid crystal panel 38 reaches an exit-side polarizing plate 39. In each pixel of the liquid crystal panel 38, the polarization direction of entering light is controlled as to whether or not to be changed by 90°. Thereby, it is selected whether the light can pass through the exit-side polarizing plate 39 or the light is absorbed and converted into heat. The light that has passed through this panel enters a projection lens 40, and is projected on a screen, which is not shown.

According to the configuration of the present embodiment, even if the size of the light sources is large, it is possible to arrange them without interference by arranging the reflection mirrors 25 and 31 in the vicinity of the entrance surfaces 13 and 14 of the sub-rod integrators 11 and 12.

Although an example using the liquid crystal panel 38 as an image display element is described in the above configuration, the configuration of the present embodiment is also applicable to a configuration using a DMD (digital mirror device), which is a reflection-type device, or a reflection-type liquid crystal device.

Further, although each light source is constituted by a discharge lamp and a reflector provided with an elliptical reflection surface in the present embodiment, the light source can also be constituted by a discharge lamp, a paraboloid or an ellipsoid with a long focal length, and a condensing lens.

Further, although the reflection mirrors 25 and 31 may be formed using aluminum reflection increasing processing if the amount of light to be handled is small, it is desirable to use reflection mirrors having a multilayer film if heat resistance is necessary. In particular, in the case of using light sources that emit light including infrared rays and ultraviolet rays, it is desirable to use mirrors having characteristics of transmitting only these.

Embodiment 3

Figure 5:
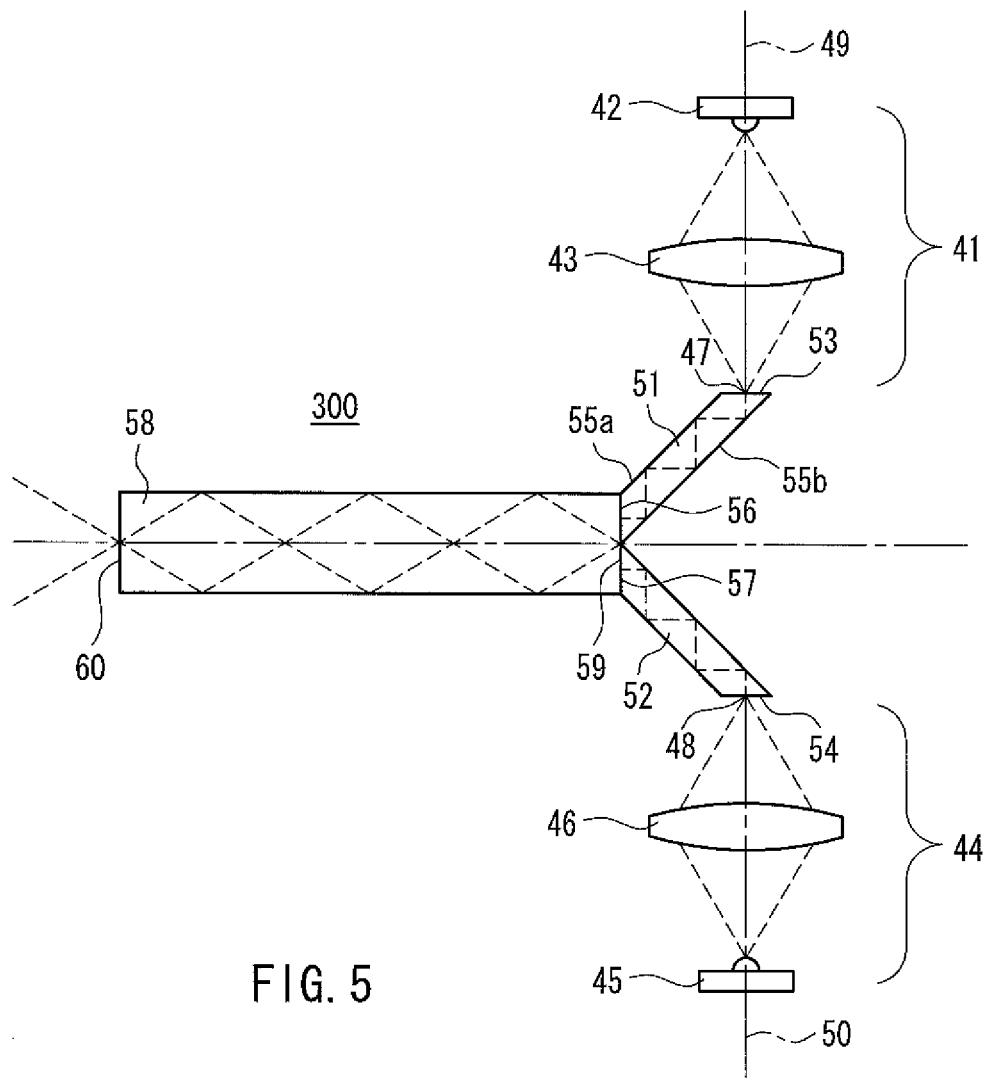
FIG. 5 is a plan view showing the configuration of a multiple-lights-combining illumination device according to Embodiment 3.

FIG. 5 shows the configuration of a multiple-lights-combining illumination device 300 according to Embodiment 3. A first light source unit 41 is constituted by an LED light source 42 mounted on a board, and a condensing lens 43 that is arranged in front of the LED light source 42 and condenses emitted light. Likewise, a second light source unit 44 is constituted by an LED light source 45 mounted on a board, and a condensing lens 46 that is arranged in front of the LED light source 45 and condenses emitted light. A condensing position 47 of the first light source unit 41 and a condensing position 48 of the second light source unit 44 are set respectively on entrance surfaces 53 and 54 of sub-rod integrators 51 and 52. Further, a reference optical axis 49 of the first light source unit 41 and a reference optical axis 50 of the second light source unit 44 pass perpendicularly through these entrance surfaces 53 and 54.

Figure 6:
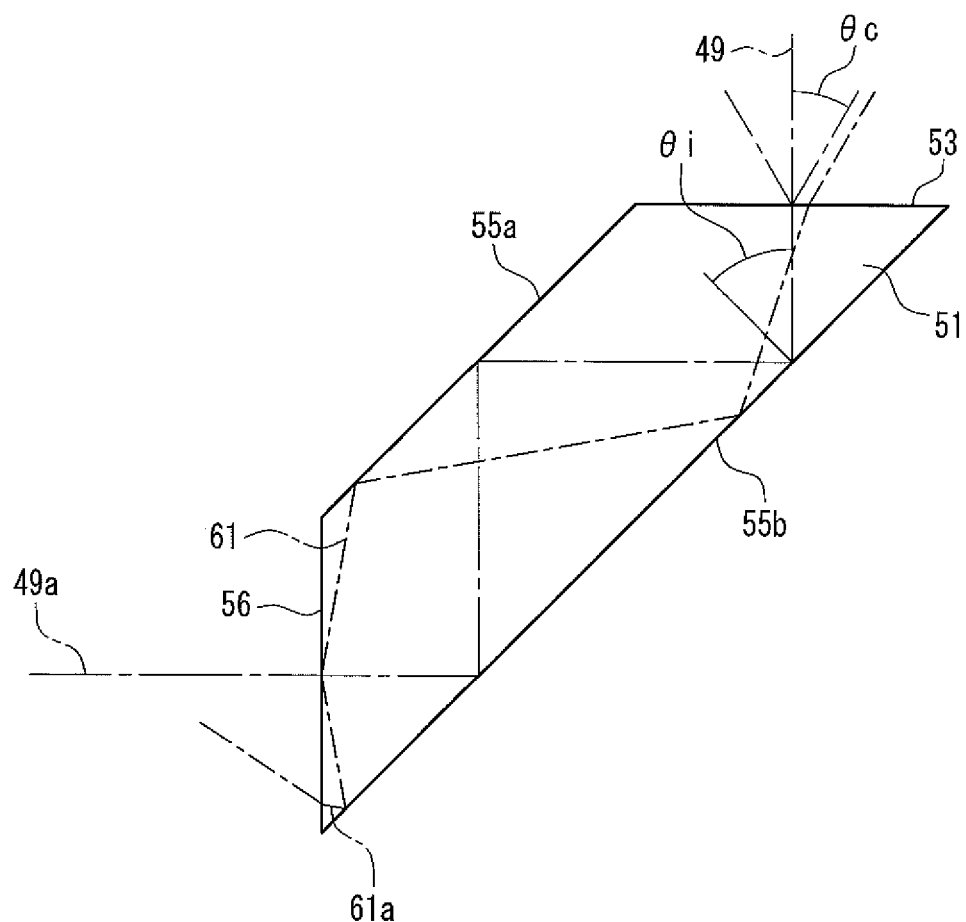
FIG. 6 is a plan view showing an enlarged view of a sub-rod integrator that is provided for the multiple-lights-combining illumination device.

The sub-rod integrators 51 and 52 are optical glass hexahedrons that have a high refractive index, and are provided with entrance and exit surfaces, that is, the entrance surfaces 53 and 54 and exit surfaces 56 and 57 that are in an orthogonal relationship. As shown in FIG. 6, in addition to the relationship between the entrance surfaces 53 and 54 and the exit surfaces 56 and 57 as being orthogonal to each other, two reflection surfaces 55a and 55b among the four side surfaces in the longitudinal direction are formed in an inclined manner such that the incident light from the entrance surface 53 totally is reflected and propagated. The reflection surfaces 55a and 55b are parallel to each other.

Further, the sum of the areas of the exit surfaces 56 and 57 of the sub-rod integrators 51 and 52 is set to be equal to the area of an entrance surface 59 of a main rod integrator 58. The reference optical axis 49 of the first light source unit 41 and the reference optical axis 50 of the second light source unit 44 that have passed through the sub-rod integrators 51 and 52 pass perpendicularly through the entrance surface 59 of the main rod integrator 58.

Light that has entered the main rod integrator 58 in this way repeatedly is reflected internally, and can exit as uniform light from an exit surface 60. With this configuration, light is propagated only by total reflection, and thus it is not necessary to apply reflection mirror coating to the rod integrators. Accordingly, cost and heat generation can be suppressed.

The present embodiment has a configuration in which the condition represented by the following equation (2) is satisfied, in addition to the condition represented by the equation (1) according to which incident light can be propagated in the sub-rod integrators without light omission, which was applied in Embodiments 1 and 2.

$$|n1 \cdot \sin(\pi/2 - 2\theta i + \sin^{-1}((\sin(\theta c))/n1))| < 1 \qquad (2)$$

Here, the symbols are shown in FIG. 6, where θi is an incident angle formed when the reference optical axis 49 from the light source is incident on the reflection surface 55b, which is the side surface of the sub-rod integrator, n1 is the refractive index of the optical glass that constitutes the sub-rod integrator 51, and θc is an angle (cone angle) formed by the light at the outermost angle with respect to the reference optical axis 49 that passes through the entrance surface 53. Note that here, θc is set to be rotationally symmetric with respect to the reference optical axis 49, and thus θc is directional. Accordingly, when − (minus) angle is set to the direction in which the angle formed with respect to a line perpendicular to the reflection surface 55b of the sub-rod integrator decreases, and also + (plus) angle is set to the direction in which the angle increases, θc indicates the range between −θc and +θc.

The meaning of the condition represented by the equation (2) is described with reference to FIG. 6. In FIG. 6, desirably, light 61 at the outermost angle incident on the exit surface 56 of the sub-rod integrator 51 totally is reflected by this surface. Otherwise, the light 61 at the outermost angle will enter the main rod integrator 58 at a very large angle, and thus will not be effective light. Therefore, the configuration is such that the light 61 at the outermost angle is totally reflected by the exit surface 56 of the sub-rod integrator 51, furthermore totally reflected by the reflection surface 55b, which is an inclined surface, and then incident on the exit surface 56 again, and at that time, the light passes through the exit surface 56 without being totally reflected. The above equation (2) indicates a condition according to which incident light that has been totally reflected by the sub-rod integrator exit surface is thus reflected by the inclined surface, and made incident on the exit surface again, thereby enabling the light to exit from the sub-rod integrator.

Note that an "exit angle" is defined as the angle formed by an optical axis 49a when the reference optical axis 49 from the light source exits, and light 61a at the outermost angle that is totally reflected by the inclined reflection surface 55b and is again incident on the exit surface 56, and the exit angle is desirably equal to the angle (cone angle) θc formed by the light at the outermost angle with respect to the reference optical axis 49 that passes through the entrance surface 53.

Example values that are actually set are shown below.

If θi is 45°, θc is −30° to +30°, and n1 is 1.8, the value of the left side of the equation (1) is:

$$n1 \cdot \sin(\theta i - \sin^{-1}(\sin(\theta c)/n1)) = 0.87.$$

Further, the value of the left side of the equation (2), that is, $$n1 \cdot \sin(\pi/2 - 2\theta i + \sin^{-1}((\sin(\theta c))/n1),$$

is −0.5 to +0.5, and the absolute value is 0.5 or less.

Based on the above values, it can be seen that there is no problem regarding exit from the exit surface 56 of the sub-rod integrator 51, which is shown by the equation (2). On the other hand, with regard to total reflection at the reflection surface 55b of the sub-rod integrator 51, which is shown by the equation (1), although there is the possibility that some of the light will be omitted, it can be said that it is in an allowable range considering cost and the like.

Further, if θi is 55°, θc is −30° to +30°, and n1 is 1.8,
the value of the left side of the equation (1) is 1.00, and
the value of the equation between the absolute value signs of the left side of the equation (2) is −1.06 to −0.12, and the absolute value is 1.06 or less.

If θi is 35°, θc is −30° to +30°, and n1 is 1.8,
the value of the left side of the equation (1) is 0.73,
the value of the equation between the absolute value signs of the left side of the equation (2) is +0.12 to +1.06, and the absolute value is 1.06 or less.

It can be seen from the above calculations that exit from the exit surface 56 of the sub-rod integrator 51 based on the equation (2) is a symmetrical value in the case where θi is 45°.

Accordingly, it is most preferable that the incident angle θi formed when the reference optical axis 49 from the light source is incident on the reflection surface 55b of the sub-rod integrator is set to be 45°. It can be seen that the refractive index and the angle (cone angle) of the light at the outermost angle can be set with a certain degree of freedom at this time.

The above numerical values indicate ideal conditions, and although it is desirable to satisfy all, as described above, satisfying all the conditions is not necessarily required for constituting the device. Appropriate conditions need to be set taking into consideration the size of the device, structural interference with other components, cost, availability, and the like.

If priority were to be given, it is desirable to determine a configuration such that the equation (2) is the first priority, and the equation (1) is satisfied if conditions allow. The reason is as follows. When θi is 45°, if the condition represented by the equation (2) is not satisfied, both of + and − sides lights at the outermost light angle (cone angle) having a large absolute value is lost. On the other hand, if the equation (1) is not satisfied, the light only on one side at the outermost angle (cone angle) for which total reflection is not likely (+θc) is lost.

Although an example using a liquid crystal panel as an image display element is described in the above configuration, the configuration of the present embodiment is also applicable to a configuration using a DMD (digital mirror devices), which is a reflection-type device, or a reflection-type liquid crystal device.

Further, although an example in which the light sources are constituted by LEDs is described in the present embodiment, the configuration of the present embodiment is also applicable to, for example, a configuration including a discharge lamp provided with a reflector that has an elliptical reflection surface, a combined configuration including a discharge lamp, a paraboloid or an ellipsoid with a long focal length, and a condensing lens, and a configuration including an LD (laser diode) light source and a condensing lens, for instance.

Although the sub-rod integrators 51 and 52 are arranged in a symmetrically opposite manner in the above configuration, there is no limitation to this configuration as long as the purpose of preventing interference of light source units is achieved. Specifically, a configuration can be adopted in which one of the sub-rod integrators is removed, and light directly enters the main-rod integrator 58. Note that it is assumed that the optical axes from the light source units are parallel when light enters the main rod integrator 58.

Note that air space (not shown) is necessary between the exit surface 56 of the sub-rod integrator 51 and the entrance surface 59 of the main rod integrator 58, and it is obvious that this should be set.

Embodiment 4

Figure 7:
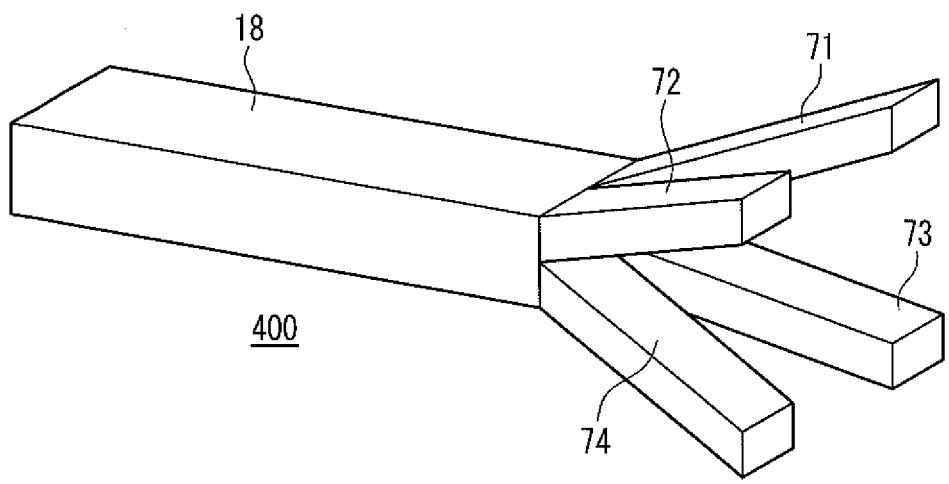
FIG. 7 is a perspective view showing rod integrators that are provided for a four-lamp illumination device according to Embodiment 4.

FIG. 7 shows the configuration of a four-lamp rod integrator 400 according to Embodiment 4. Although the configuration in which two light source units are provided is described in Embodiments 1, 2, and 3 above, a configuration is also possible in which four light source units are provided. In this case, as shown in FIG. 7, the four-lamp rod integrator 400 is used, which is provided with four sub-rod integrators 71, 72, 73, and 74, each of which is constituted by entrance and exit surfaces parallel to the entrance surface of the main rod integrator 18, and four surfaces inclined thereto.

Thereby, it becomes possible to combine light from four light source units, which are not shown. The present embodiment is applicable to the configuration using a combination of reflection mirrors as described in Embodiment 2. Further, a configuration is adopted in which the total of the areas of the exit surfaces of the sub-rod integrators 71, 72, 73, and 74 is equal to the area of the entrance surface of the main rod integrator 18.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A multiple-lights-combining illumination device, comprising: multiple light sources; multiple sub-rod integrators that respectively guide light from the multiple light sources; and a main rod integrator that guides light from the multiple sub-rod integrators, wherein each of the sub-rod integrators has reflection surfaces that are parallel to each other in a longitudinal direction, and has an entrance surface and an exit surface that are parallel or perpendicular to each other at ends thereof, the main rod integrator has reflection surfaces that are parallel to each other in a longitudinal direction, and has an entrance surface and an exit surface that are perpendicular to the reflection surfaces at ends thereof, and each reference optical axis that passes through an optical centroid portion of a light-emitting part of the light sources along a light emission direction is arranged so as to pass through substantially a center of the entrance surface of the respective sub-rod integrator, and the following relationship is satisfied:

$n1 \cdot \sin(\theta i - \sin^{-1}(\sin(\theta c)/n1)) > 1$ where θi represents an incident angle of each of the reference optical axes with respect to the reflection surface of the respective sub-rod integrator, θc represents an angle formed in air at the entrance surface of the respective sub-rod integrator by each of the reference optical axes and light at an outermost angle of effective incident light from the respective light source that is finally allowed to exit from the main rod integrator, and n1 represents a refractive index of each of the sub-rod integrators.

2. The multiple-lights-combining illumination device according to claim 1,
wherein the following relationship is satisfied:

$$|n1 \cdot \sin(\pi/2 - 2\theta i + \sin^{-1}((\sin(\theta c))/n1))| < 1$$

where $\theta i$ represents an incident angle of each of the reference optical axes with respect to the reflection surface of the respective sub-rod integrator, $\theta c$ represents an angle formed by each of the reference optical axes and light at an outermost angle of effective incident light from the respective light source in air, and n1 represents a refractive index of a material of each of the sub-rod integrators, and when − (minus) angle is set to a direction in which an angle formed by incident light from the respective light source with respect to a line perpendicular to the reflection surface decreases, and + (plus) angle is set to a direction in which the angle increases, $\theta c$ is given a range between $-\theta c$ and $+\theta c$.

3. The multiple-lights-combining illumination device according to claim 1,
wherein when the reference optical axis passes perpendicularly through the entrance surface of the respective sub-rod integrator, an angle formed by the entrance surface and the reflection surface is 45 degrees.

4. The multiple-lights-combining illumination device according to claim 1, further comprising a reflection mirror arranged in a vicinity of the entrance surface of each of the sub-rod integrators,
wherein light from the light source is bent by the reflection mirrors, so that the reference optical axis passes perpendicularly through the entrance surface of the respective sub-rod integrator.

5. The multiple-lights-combining illumination device according to claim 1,
wherein two sets of the light source and the sub-rod integrator are provided, and the two light sources are arranged at opposing positions.

6. The multiple-lights-combining illumination device according to claim 1,
wherein four sets of the light source and the sub-rod integrator are provided, and two pairs of two sets of the light sources are arranged at opposing positions.

7. The multiple-lights-combining illumination device according to claim 1,
wherein the sub rod integrators and the main rod integrator are glass rod integrators.

8. The multiple-lights-combining illumination device according to claim 1,
wherein each of the light sources includes a discharge lamp and a reflector provided with an elliptical reflection surface, and each of the reflectors has one focal point on a light-emitting part of the respective discharge lamp, and another focal point on the entrance surface of the respective sub-rod integrator.

9. The multiple-lights-combining illumination device according to claim 1,
wherein each of the light sources includes a discharge lamp, a reflector provided with a reflection surface that reflects light from the discharge lamp in an opening direction, and a condensing lens, and a position where the light from each of the discharge lamps is condensed by the respective condensing lens is located on the entrance surface of the respective sub-rod integrator.

10. The multiple-lights-combining illumination device according to claim 1,
wherein each of the light sources includes an LED and a condensing lens that condenses light from the LED, and a position where the light from the LED is condensed by the respective condensing lens is located on the entrance surface of the respective sub-rod integrator.

11. The multiple-lights-combining illumination device according to claim 1,
wherein the exit surface of each of the sub-rod integrators and the entrance surface of the main rod integrator are arranged so as to be parallel and adjacent to each other.

12. A projection-type display apparatus comprising:
the multiple-lights-combining illumination device according to claim 1;
a relay optical system that guides light from the main rod integrator;
an image display element that is arranged at an illumination position of the light guided by the relay optical system; and
a projection lens with which an image on the image display element can be magnified and projected.

* * * * *